US009123154B2

(12) United States Patent
Burley et al.

(10) Patent No.: US 9,123,154 B2
(45) Date of Patent: Sep. 1, 2015

(54) DISTRIBUTED ELEMENT RENDERING

(71) Applicants: Brent Burley, Monterey Park, CA (US); Andrew Selle, Montrose, CA (US); Christian Eisenacher, Burbank, CA (US); Gregory Nichols, North Hollywood, CA (US)

(72) Inventors: Brent Burley, Monterey Park, CA (US); Andrew Selle, Montrose, CA (US); Christian Eisenacher, Burbank, CA (US); Gregory Nichols, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 300 days.

(21) Appl. No.: 13/648,004

(22) Filed: Oct. 9, 2012

(65) Prior Publication Data

US 2014/0098122 A1    Apr. 10, 2014

(51) Int. Cl.
G09G 5/02 (2006.01)
G06T 15/50 (2011.01)
G06T 15/60 (2006.01)
G06T 15/00 (2011.01)

(52) U.S. Cl.
CPC .................................... *G06T 15/005* (2013.01)

(58) Field of Classification Search
CPC ...................................................... G06T 15/005
See application file for complete search history.

(56) References Cited

U.S. PATENT DOCUMENTS

| 5,045,995 | A | 9/1991 | Levinthal | |
|---|---|---|---|---|
| 5,923,330 | A | 7/1999 | Tarlton | |
| 6,016,150 | A | 1/2000 | Lengyel | |
| 6,300,965 | B1 | 10/2001 | Sowizral | |
| 6,326,964 | B1 * | 12/2001 | Snyder et al. | 345/419 |
| 6,496,601 | B1 | 12/2002 | Migdal | |
| 6,714,936 | B1 | 3/2004 | Nevin | |
| 7,095,409 | B2 | 8/2006 | Cook | |
| 7,129,940 | B2 | 10/2006 | Cook | |
| 7,168,074 | B1 * | 1/2007 | Srinivasa et al. | 718/100 |
| 7,289,119 | B2 * | 10/2007 | Heirich et al. | 345/427 |
| 7,675,518 | B1 | 3/2010 | Miller | |
| 7,783,695 | B1 * | 8/2010 | Tyrrell et al. | 709/201 |
| 8,106,906 | B1 | 1/2012 | Duff | |

(Continued)

OTHER PUBLICATIONS

Crassin, C. et al.: "Interactive Indirect Illumination Using Voxel Cone Tracing", Pacific Graphics 2011, vol. 30, No. 7, 2011, 10 pages, Retrieved from the Internet: <URL:https://research.nvidia.com/sites/default/files/publications/GIVoxels-pg2011-authors.pdf>.
Arvo, J.: "Fast Ray Tracing by Ray Classification", ACM, 2 Penn Plaza, Suite 701—New York USA, vol. 21, No. 4, Jul. 1987 10 pages.
Amanatides, J.: "Ray tracing with cones" Computers and Graphics, Elsevier, GB, vol. 18, No. 3, Jul. 1, 1984, pp. 129-135, 7 pages.

(Continued)

*Primary Examiner* — Kee M Tung
*Assistant Examiner* — Frank Chen
(74) *Attorney, Agent, or Firm* — Farjami & Farjami LLP

(57) ABSTRACT

A method is provided for distributed element rendering with particular application for feature films and other demanding content creation using scenes of high complexity requiring global illumination. A persistent centralized scheduler receives shading queries that are added to a request queue, determines an assignment of the request queue to hardware resources based on a resource map, and processes the request queue according to the assignment to render frames of one or more scenes. The resource map may be built by the scheduler and indicates local scene geometry cached for each of the hardware resources. By generating a full set of camera rays at each hardware resource, global illumination shading and other rendering can proceed independently against local geometry caches for high parallelism. Redundant computations are reduced through the scheduler, which may cache frequently requested rendering results including tessellation, shading, and level of detail.

26 Claims, 3 Drawing Sheets

(56) References Cited

U.S. PATENT DOCUMENTS

| | | | |
|---|---|---|---|
| 8,174,524 | B1 | 5/2012 | Laur |
| 8,217,949 | B1 | 7/2012 | Carpenter |
| 8,400,447 | B1 | 3/2013 | Carr |
| 8,411,082 | B1 | 4/2013 | Cook |
| 8,416,260 | B1 | 4/2013 | Carpenter |
| 8,436,856 | B1 | 5/2013 | Duff |
| 8,436,867 | B1 | 5/2013 | Duff |
| 8,466,919 | B1 | 6/2013 | Duff |
| 8,493,383 | B1 | 7/2013 | Cook |
| 2002/0050990 | A1 | 5/2002 | Sowizral |
| 2005/0146522 | A1 | 7/2005 | Maillot |
| 2005/0243086 | A1 | 11/2005 | Schechter |
| 2006/0209067 | A1 | 9/2006 | Pellacini |
| 2007/0262988 | A1 | 11/2007 | Christensen |
| 2008/0180440 | A1 | 7/2008 | Stich |
| 2009/0225081 | A1 | 9/2009 | Keller |
| 2009/0262132 | A1 | 10/2009 | Peterson |
| 2010/0231589 | A1 | 9/2010 | Salsbury |
| 2012/0147015 | A1* | 6/2012 | Rogers et al. ............ 345/502 |
| 2013/0016107 | A1* | 1/2013 | Dharmapurikar ......... 345/501 |
| 2014/0285499 | A1* | 9/2014 | Iwasaki .................... 345/502 |

OTHER PUBLICATIONS

Wald, I. et al: "Interactive Global Illumination using Fast Ray Tracing", ACM, 2 Penn Plaza, Suite 701—New York USA, 2002 11 pages.

Wikipedia: "Stencil Buffer", Apr. 3, 2012, Retrieved from the Internet: <URL:http://en.wikipedia.org/w/index.php?title=Stencil_buffer&oldid=485283047> 2 pages.

EESR dated Feb. 7, 2013 re Application No. 13160552.9.

Áfra, A., "Incoherent Ray Tracing without Acceleration Structures", Eurographics 2012 Short Paper, 4 pages.

Aila et al. 2010. Architecture considerations for tracing incoherent rays. In *Proceedings of the Conference on High Performance Graphics* (HPG '10). Eurographics Association, Aire-la-Ville, Switzerland, Switzerland, 113-122.

Arvo et al., Fast ray tracing by ray classification, Proceedings of the 14th annual conference on Computer graphics and interactive techniques, p. 55-64, Aug. 1987 [doi>10.1145/37401.37409].

Benthin et al., Combining Single and Packet-Ray Tracing for Arbitrary Ray Distributions on the Intel MIC Architecture, IEEE Transactions on Visualization and Computer Graphics, v.18 n.9, p. 1438-14, Sep. 2012.

Bikker, J., Improving Data Locality for Efficient In-Core Path Tracing, Computer Graphics Forum, v.31 n.6, p. 1936-1947, Sep. 2012 [doi>10.1111/j.1467-8659.2012.03073.x].

Boulos et al.: Adaptive ray packet reordering. In *Proc. of Interactive Ray Tracing* (2008).

Budge et al.: Out-of-core data management for path tracing on hybrid resources. In *Computer Graphics Forum* (2009).

Christensen et al., "Ray Tracing for the Movie 'Cars'", Interactive Ray Tracing 2006, IEEE Symposium, Sep. 18-20, 2006, pp. 1-6.

Crassin et al. (2011), Interactive Indirect Illumination Using Voxel Cone Tracing. Computer Graphics Forum, 30: 1921-1930. doi: 10.1111/j.1467-8659.2011.02063.x.

Dammertz et al., Shallow bounding volume hierarchies for fast SIMD ray tracing of incoherent rays, Proceedings of the Nineteenth Eurographics conference on Rendering, Jun. 23-25, 2008, Sarajevo, Bosnia and Herzegovina.

Ernst et al.: Multi bounding volume hierarchies. In Proc. of Interactive Ray Tracing (2008).

Garanzha et al.: Fast ray sorting and breadth-first packet traversal for GPU ray tracing. *Computer Graphics Forum* (2010).

Gribble et al.: Coherent ray tracing via stream filtering. In *Proc. of Interactive Ray Tracing* (2008).

Hanika et al., Two-level ray tracing with reordering for highly complex scenes, Proceedings of Graphics Interface 2010, May 31-Jun. 2, 2010, Ottawa, Ontario, Canada.

Hanrahan, P., Using caching and breadth-first search to speed up ray-tracing, Proceedings on Graphics Interface '86/Vision Interface '86, p. 56-61, Aug. 1986, Vancouver, British Columbia, Canada.

Hoberock et al., Stream compaction for deferred shading, Proceedings of the Conference on High Performance Graphics 2009, Aug. 1-3, 2009, New Orleans, Louisiana [doi>10.1145/1572769.1572797].

Kato et al., "Parallel Rendering and the Quest for Realism: The 'Kilauea' Massively Parallel Ray Tracer", Practical Parallel Processing for Today's Rendering Challenges, SIGGRAPH 2001, Course Note #40, ACM, Aug. 2001, Los Angeles, USA, Aug. 12-17, 1 p.

Kato, T., "Kilauea": parallel global illumination renderer, Proceedings of the Fourth Eurographics Workshop on Parallel Graphics and Visualization, Sep. 9-10, 2002, Blaubeuren, Germany.

Keller et al., "Efficient Ray Tracing without Auxiliary Acceleration Data Structure", HPG 2011, 1 page.

Moon et al., Cache-oblivious ray reordering, ACM Transactions on Graphics (TOG), v.29 n.3, p. 1-10, Jun. 2010 [doi>10.1145/1805964.1805972].

Nakamaru et al., Breadth-First Ray Tracing Utilizing Uniform Spatial Subdivision, IEEE Transactions on Visualization and Computer Graphics, v.3 n.4, p. 316-328, Oct. 1997 [doi>10.1109/2945.646235].

Navratil et al., Dynamic Ray Scheduling to Improve Ray Coherence and Bandwidth Utilization, Proceedings of the 2007 IEEE Symposium on Interactive Ray Tracing, p. 95-104, Sep. 10-12, 2007 [doi>10.

Overbeck et al.: Large ray packets for real-time Whitted ray tracing. In *Proc. of Interactive Ray Tracing* (2008).

Pantaleoni et al., PantaRay: fast ray-traced occlusion caching of massive scenes, ACM Transactions on Graphics (TOG), v.29 n.4, Jul. 2010 [doi>10.1145/1778765.1778774].

Pharr et al., Rendering complex scenes with memory-coherent ray tracing, Proceedings of the 24th annual conference on Computer graphics and interactive techniques, p. 101-108, Aug. 1997 [doi>10.1145/258734.2587.

Ramani et al., 2009. StreamRay: a stream filtering architecture for coherent ray tracing. *SIGPLAN* Not. 44, 3 (Mar. 2009), 325-336. DOI=10.1145/1508284.1508282 http://doi.acm.org/10.1145/1508284.1508282.

Reinhard et al., Hybrid scheduling for parallel rendering using coherent ray tasks, Proceedings of the 1999 IEEE symposium on Parallel visualization and graphics, p. 21-28, Oct. 25-26, 1999, San Francisco, California.

Reshetov et al., Multi-level ray tracing algorithm, ACM Transactions on Graphics (TOG), v.24 n.3, Jul. 2005 [doi>10.1145/1073204.1073329].

Tsakok, J., Faster incoherent rays: Multi-BVH ray stream tracing, Proceedings of the Conference on High Performance Graphics 2009, Aug. 1-3, 2009, New Orleans, Louisiana [doi>10.1145/1572769.1572793].

Wald et al. "SIMD Ray Stream Tracing—SIMD Ray Traversal with Generalized Ray Packets and On-the-fly Re-Ordering." *Infbrme Técnico, SCI Institute* (2007).

Wald et al., Interactive distributed ray tracing of highly complex models, Proceedings of the 12th Eurographics conference on Rendering, Jun. 1, 2001, London, UK [doi>10.2312/EGWR/EGWR01/277-288].

Wald et al.: Getting rid of packets: efficient SIMD single-ray traversal using multi-branching BVHs. In Proc. of Interactive Ray Tracing (2008).

U.S. Appl. No. 12/043,041, filed Mar. 5, 2008, Titled "Multithreading in Rendering", First Named Inventor: Fong.

U.S. Appl. No. 12/120,711, filed May 15, 2008, Titled "Lagrangian Filtering", First Named Inventor: Carpenter.

U.S. Appl. No. 12/533,965, filed Jul. 31, 2009, Titled "System and Methods for Implementing Object Oriented Structures in a Shading Language", First Named Inventor: Duff.

U.S. Appl. No. 13/280,258, filed Oct. 24, 2011, Titled "Programmable System for Artistic Volumetric Lighting", First Named Inventor: Nowrouzezahrai.

* cited by examiner

Fig. 3A
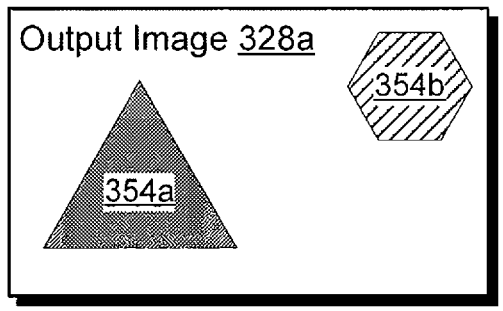
Scene 1, Frame 1
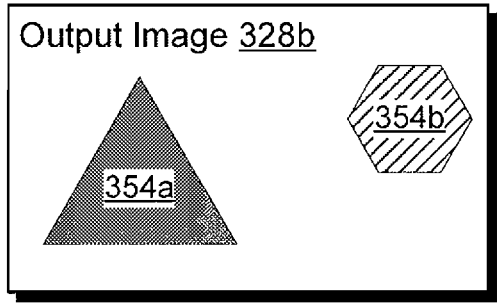
Scene 1, Frame 2
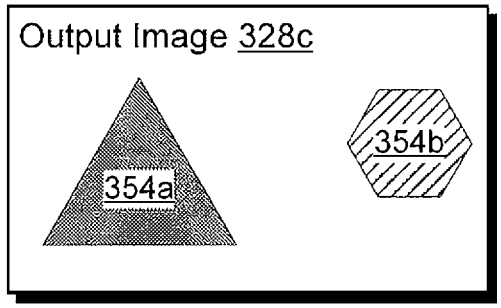
Scene 1, Frame 3
Fig. 3B
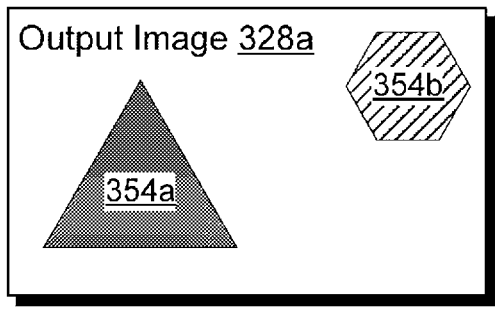
Scene 1, Frame 1
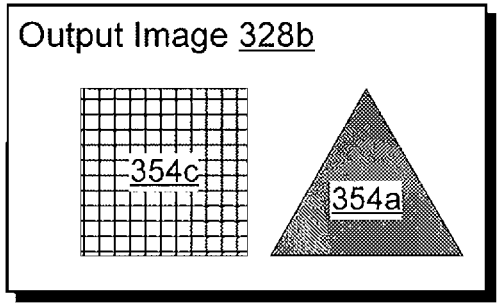
Scene 2, Frame 1

DISTRIBUTED ELEMENT RENDERING

BACKGROUND

Realistic lighting is an important component of high quality computer rendered graphics. By utilizing a renderer employing a global illumination model, scenes can be provided with convincing reflections and shadows, providing the requisite visual detail demanded by feature length animated films and other content. Conventionally, a ray tracing renderer may be utilized to provide global illumination in a simple manner. However, with large processing overhead and highly random data access requirements, ray tracing places a heavy processing demand for complex scenes with larger amounts of data, as with feature films and other demanding content.

Accordingly, to keep rendering times manageable and to adhere to a production schedule, a renderer needs to efficiently use available computing resources, for example by parallel processing. Conventionally, parallel rendering may be achieved by spatially dividing a single frame into multiple tiles for concurrent processing and/or by rendering multiple sequential frames, each in parallel. However, since many of the same scene objects are independently and redundantly rendered by these approaches, available hardware resources are not optimally utilized.

SUMMARY

The present disclosure is directed to distributed element rendering, substantially as shown in and/or described in connection with at least one of the figures, as set forth more completely in the claims.

BRIEF DESCRIPTION OF THE DRAWINGS

FIGS. 3A and 3B present exemplary sets of frames for distributed element rendering.

DETAILED DESCRIPTION

Figure 1:
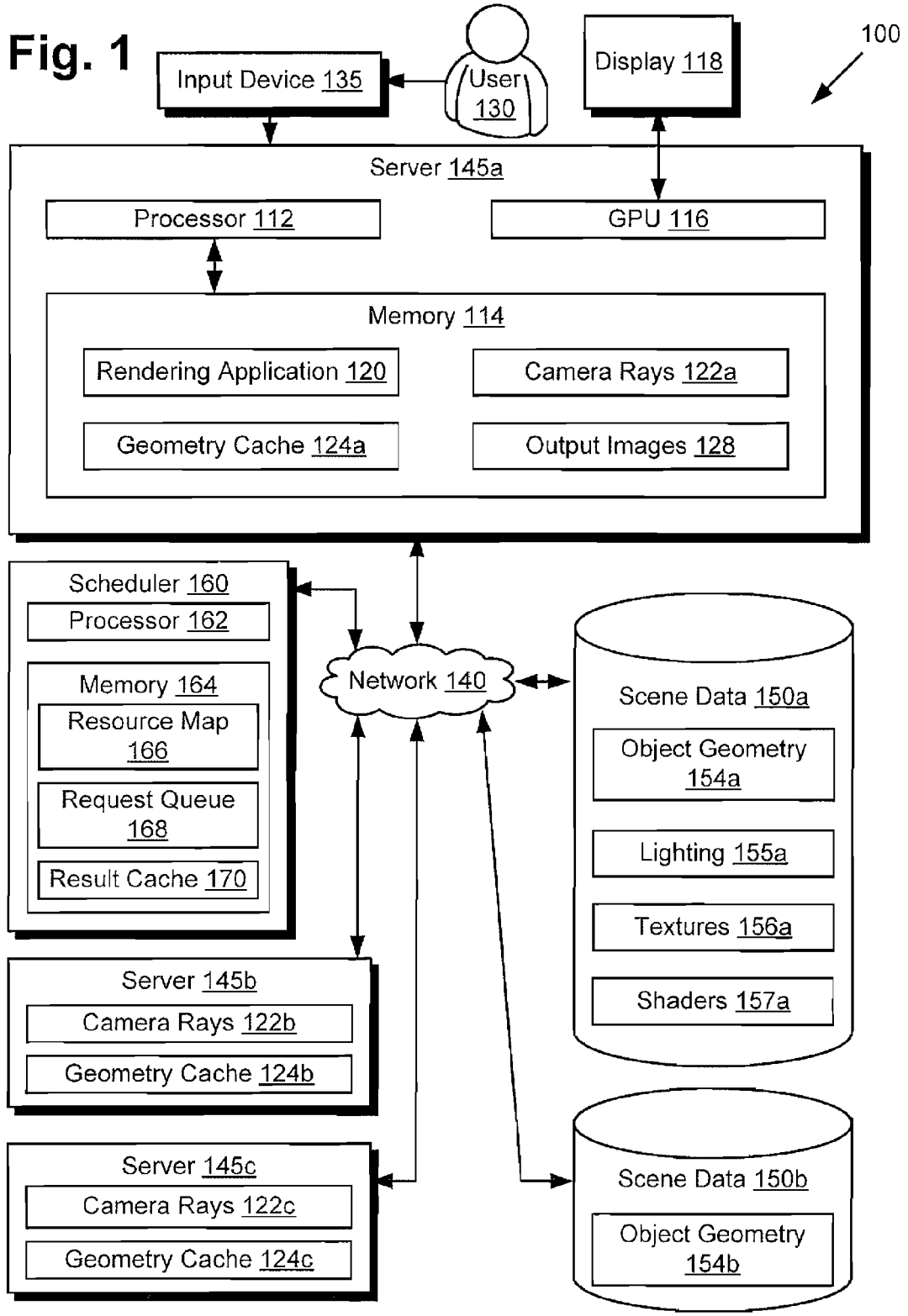
FIG. 1 presents an exemplary diagram of a system for providing distributed element rendering.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for providing distributed element rendering. Diagram 100 of FIG. 1 includes display 118, user 130, input device 135, network 140, server 145a, server 145b, server 145c, scene data 150a, scene data 150b, and scheduler 160. Server 145a includes processor 112, memory 114, and graphics processing unit (GPU) 116. Memory 114 includes rendering application 120, camera rays 122a, geometry cache 124a, and output images 128. Server 145b includes camera rays 122b and geometry cache 124b. Server 145c includes camera rays 122c and geometry cache 124c. Scene data 150a includes object geometry 154a, lighting 155, textures 156, and shaders 157. Scene data 150b includes object geometry 154b. Scheduler 160 includes processor 162 and memory 164. Memory 164 includes resource map 166, request queue 168, and result cache 170. In other embodiments, some of the elements in FIG. 1 may be shared, combined, and/or integrated, such as the servers, processors, and/or memories.

Server 145a may comprise any computing device such as a rackmount server, desktop computer, or mobile computer. User 130 may utilize input device 135, for example a keyboard and mouse, to direct the operation of rendering application 120 executing in memory 114 of processor 112. Rendering application 120 may process scene data 150a and/or scene data 150b received from network 140 to generate rendered output images 128 for output to display 118 through GPU 116. Network 140 may be a high speed network suitable for high performance computing (HPC), for example a 10 GigE network or an InfiniBand network. Once completed, output images 128 may also be copied to non-volatile storage, not shown in FIG. 1.

Output images 128 may correspond to multiple frames of scene data 150a and/or 150b with specific camera views and positioning of object geometry 154a-154b in virtual space. Object motion data, virtual camera parameters, virtual camera paths, and other animation parameters may also be present in scene data 150a-150b, so that rendering application 120 can generate several animation frames for output images 128. Lighting 155a may include the properties of all light sources within the scene. Textures 156a may include all textures necessary for object geometry 154a. Shaders 157a may include any shaders necessary to correctly shade object geometry 154a. Scene data 150b may correspond to a different animation from scene data 150a but may also contain similar elements as scene data 150a, which are omitted for simplicity. Some objects may also be shared between scene geometry 154a and scene geometry 154b. Objects may be optionally referenced from a centralized object database, which is not shown in FIG. 1.

As previously discussed, it is desirable to provide realistic lighting for a computer generated graphics rendering, or output images 128. While rasterizing renderers can provide high performance, global illumination can only be approximated. For demanding applications such as feature film rendering, global illumination is required from rendering application 120. However, such demanding applications may also require highly complicated scenes, with object geometry 154a of scene data 150a being at least an order of magnitude larger than memory 114. Artists may require massive complexity with the use of highly detailed three-dimensional models and tesselation, procedural generation of objects and landscapes, and asset duplication and re-use, resulting in object geometry 154a having huge numbers of geometric primitives. Accordingly, using a straightforward ray tracing algorithm for rendering application 120 quickly grows impractical.

Furthermore, to keep rendering times manageable and to adhere to a production schedule, it is desirable to parallelize the rendering process, for example by rendering multiple frames of a scene and/or multiple scenes concurrently. Some implementations may also require a frame of a scene to be rendered in multiple camera views, for example to provide alternative camera angles or to provide stereoscopic rendering. Thus, multiple frames of scene data 150a and multiple frames of scene data 150b may need to be rendered concurrently for efficient utilization of available hardware and computing resources.

One conventional approach for parallelizing rendering application 120 is to divide the rendering of output images 128 into multiple tiles for independent processing. However, because the tile divisions often divide into object geometry, redundancy is introduced as each process must independently process the same objects. Another conventional approach is to assign sequential frames of output images 128 to independent processes. However, because many scenes typically involve slow moving or stationary cameras where many of the same objects are slowly moving or static between adjacent frames, redundancy is also introduced by this approach as well. As a result, available computing resources are not fully optimized.

Accordingly, distributed element rendering is proposed for rendering application 120. User 130 may use input device 135 to request the rendering of multiple frames from scene data 150a and scene data 150b as output images 128. Rendering application 120 may forward the requests to scheduler 160, a computing device providing a persistent process for efficiently gathering and distributing rendering workloads to hardware resources. Thus, the frame rendering requests may be added to request queue 168, including shading queries for object geometry 154a-154b as positioned in each frame of output images 128, for example according to camera path and object motion data. Although scheduler 160 is shown as a separate hardware component in FIG. 1, alternative implementations may consolidate the functions of scheduler 160 with other hardware, such as server 145a.

As shown in FIG. 1, besides server 145a, which also functions as a workstation host for user 130, additional computing resources are available from servers 145b and 145c, both accessible over network 140. Servers 145b and 145c may each include elements similar to those of server 145a, which are omitted from FIG. 1 for simplicity. SIMD (single instruction, multiple data) instructions on processor 112 and shaders on GPU 116 may be utilized for higher parallelism. Alternative implementations may utilize additional servers for increased computational capacity and additional workstation hosts for multi-user support.

To assist scheduler 160 with workload allocation, resource map 166 may include a mapping of scene geometry to hardware resources. Thus, in FIG. 1, resource map 166 may map the contents of geometry cache 124a as associated with server 145a, the contents of geometry cache 124b as associated with server 145b, and the contents of geometry cache 124c as associated with server 145c. If servers 145a-145c are not yet populated with geometry caches, then scheduler 160 may also dictate how to populate geometry caches 124a-124c from object geometry 154a-154b, building resource map 166 in the process. The mapping of resource map 166 may utilize a streaming traversal of a scene bounding hierarchy, such as bounding volume hierarchy (BVH) (BVH), for object geometry 154a and 154b. The outstanding request queue 168, the contents of result cache 170, and other organizational criteria may also be analyzed to determine the resource map 166. Moreover, resource map 166 may be dynamically remapped to keep geometry caches 124a-124c optimized for present and future rendering workloads.

Returning back to server 145a, a full set of camera rays 122a necessary for rendering frames of output images 128 may be generated and kept within memory 114. This enables object geometry 154a and/or object geometry 154b to be partially cached or streamed into geometry cache 124a of memory 114 for in-memory processing against camera rays 122a and other elements of scene data 150a or 150b as necessary. Similarly, servers 145b and 145c may also stream and process their respective geometry caches 124b and 124c in-memory against a local full set of camera rays 122b and 122c.

Additionally, since all camera rays are available to each hardware resource, global illumination bounces through geometry can be processed and deferred into sequential batch passes rather than being processed recursively. In this manner, data coherency is much greater compared to a conventional ray tracer that traces rays individually or in small groups at a time and recursively through geometry. In alternative implementations, cones or other shapes may also be utilized instead of rays.

Returning to scheduler 160, processor 162 of scheduler 160 may execute a persistent scheduling thread to manage and process request queue 168. Render job requests including shading queries are received and added to request queue 168, which may be accumulated by the scheduling thread until a sufficient number of queries are gathered for parallelization. After enough shading queries are gathered, processor 162 may process request queue 168 by grouping and assigning the shading queries to individual hardware resources, or servers 145a-145c in FIG. 1, according to resource map 166. Thus, if only geometry cache 124a contains a table object, then all shading requests for the table object are gathered and sent to server 145a, as the geometry mapping is already recorded in resource map 166. If the table object is available to each of geometry caches 124a-124c, then only a single server from servers 145a-145c may be assigned to shade the table object. Alternatively, multiple servers may be utilized if the table object is to be shaded with different rendering parameters, for example from different camera angles or with deformations applied.

As servers 145a-145c complete the rendering of their assigned shading requests from request queue 168, intermediate and final results including tessellation, shading results, level of detail (LOD), and other results may be returned to scheduler 160 and stored in result cache 170. Accordingly, other rendering processes and/or downstream shading requests in request queue 168 can be accelerated by utilizing the results already existing in result cache 170, as applicable. For example, if many scenes require a particular object, for example a chair to be rendered, then any tessellation, LOD, and shading results for the chair may be cached in result cache 170.

While result cache 170 is shown as centralized in scheduler 160, other implementations may also include local result caches at each hardware resource. This approach may be especially useful in conjunction with virtualization techniques. For example, a virtual server may be suspended during or after the rendering of a particular object profiled to be used extensively in a particular scene. To meet workload demands when the particular scene is to be rendered, the virtual server may be cloned and resumed, allowing commonly recurring rendering tasks to be prepared and performed in advance.

Figure 2:
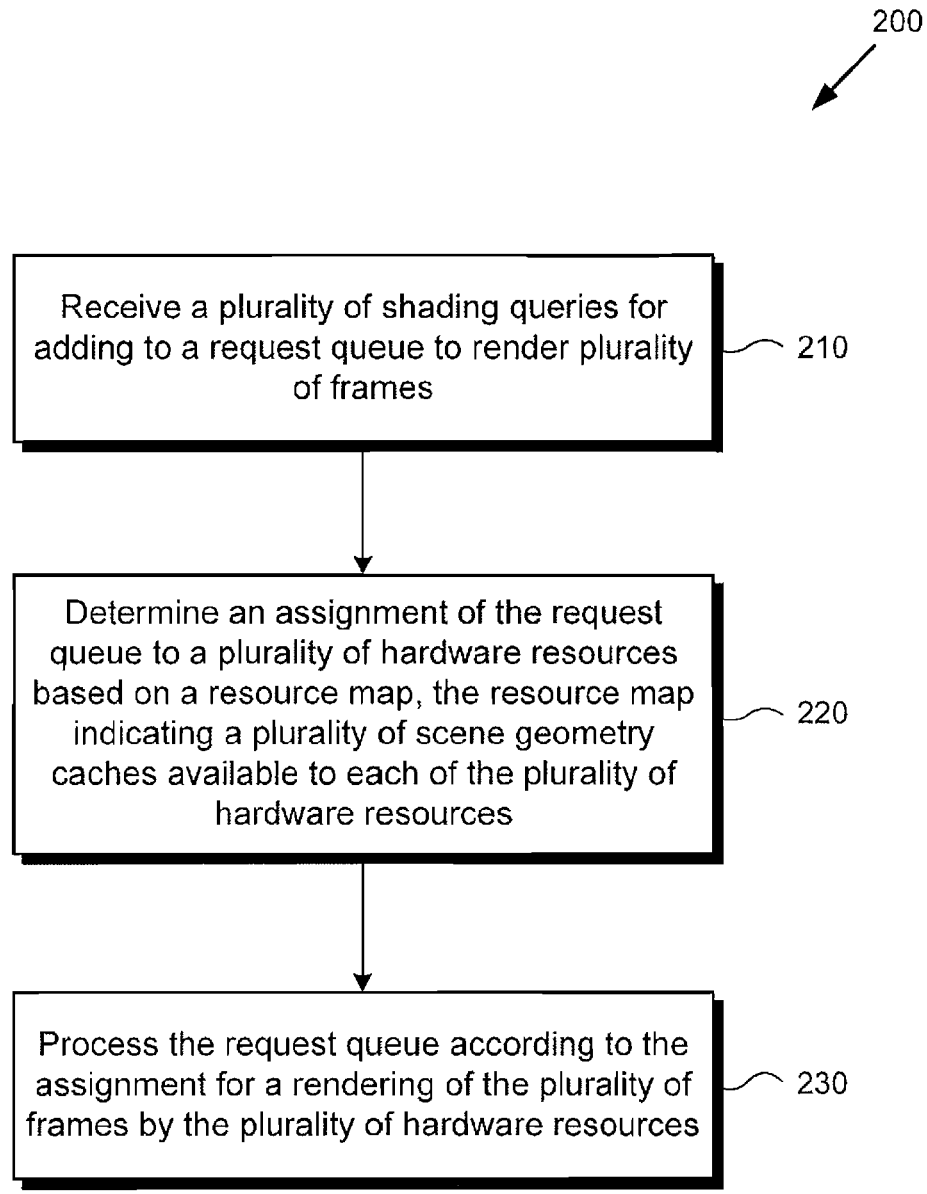
FIG. 2 presents an exemplary flowchart illustrating a method for providing distributed element rendering.

FIG. 2 presents an exemplary flowchart illustrating a method for providing distributed element rendering. Flowchart 200 begins when processor 162 of scheduler 160 receives a plurality of shading queries for adding to request queue 168 to render output images 128 (block 210). For example, user 130 may use input device 135 to direct rendering application 120 of server 145a to queue multiple frames of scene data 150a and/or scene data 150b for rendering as output images 128. As previously discussed, scheduler 160 may be a persistent process that gathers shading queries until a sufficient number is queued for parallel processing. As one example, scheduler 160 may start processing request queue 168 only after shading queries for at least three different frames are received.

Next, processor 162 of scheduler 160 determines an assignment of request queue 168 to servers 145a-145c based on resource map 166, where resource map 166 indicates a geometry cache 124a-124c available to each of servers 145a-145c, respectively (block 220). As previously discussed, scheduler 160 may build resource map 166 based on a scene bounding hierarchy traversal of object geometry 154a-154b or other criteria. Resource map 166 may also be dynamically updated as the contents of geometry cache 124a-124c may be streamed and optimized during rendering. Based on resource map 166, shading requests in request queue 168 can be assigned to the appropriate hardware resource having the associated geometry already cached for shading.

Next, processor 162 of scheduler 160 processes the request queue 168 according to the assignment for a rendering of output images 128 by servers 124a-124c (block 230). Since each of servers 124a-124c may independently have a full set of camera rays, each server can independently carry out the respectively assigned shading requests in parallel without dependencies from other servers. Once the shading requests are rendered, intermediate and final results including tessellation, shading, and LOD may be cached locally or consolidated at result cache 170 to accelerate downstream processing of request queue 168. Servers 145a-145c may optionally be virtual servers, in which case the servers may be suspended, cloned, and resumed as necessary to efficiently process recurring rendering workloads. Server 145a may assemble the returned shading results from scheduler 160 into final frames of output images 128. Output images 128 may be placed into non-volatile storage as part of one or more video render files, and may also be shown on display 118.

In one implementation, after receiving the plurality of shading queries, processor 112 utilizes a cost metric to compare the assignment of the request queue to the plurality of hardware resources with retrieving geometry and shading data from the plurality of scene geometry caches and performing the shading queries locally. In certain cases, the amount of network bandwidth required to send the rays may be considerably larger than retrieving the geometry and performing the intersection on a render host or server 145a. Even more, in an additional implementation, processor 112 may forward the shading queries to another processor or server if the shading queries do not yield any intersection hits.

FIGS. 3A and 3B present exemplary sets of frames for distributed element rendering. Diagram 310 of FIG. 3A includes output images 328a, 328b, and 328c, which each include objects 354a and 354b. Diagram 320 of FIG. 3B includes output image 328a, which includes objects 354a and 354b, and output image 328b, which includes objects 354a and 354c. With respect to FIG. 3A, output images 328a-328c may correspond to output images 128 in FIG. 1, and objects 354a-354b may correspond to objects of object geometry 154a in FIG. 1. With respect to FIG. 3B, output images 328a-328b may correspond to output images 128 in FIG. 1, objects 354a and 354b of output image 328a may correspond to objects of object geometry 154a in FIG. 1, and objects 354a and 354c of output image 328b may correspond to objects of object geometry 154b in FIG. 1.

Diagram 310 demonstrates a set of sequential frames for a single scene. For simplicity, rendered objects 354a and 354b in output images 328a-328c are represented by simple two-dimensional shapes. As shown in diagram 310, objects 354a-354b may remain fairly static between frames that are temporally proximate, as in sequential frames of a scene. Thus, if output images 328a, 328b, and 328c are rendered in parallel, redundancy is introduced as objects 354a and 354b are unnecessarily rendered three times.

Referring then to FIG. 1, scheduler 160 may instead assign server 145a to render object 354a, which may be present in geometry cache 124a, and server 145b to render object 354b, which may be present in geometry cache 124b. As previously discussed, resource map 166 may indicate the state of the individual geometry caches, and may be generated according to a scene bounding hierarchy traversal. The resulting shading of the objects is stored in result cache 170. Rendering application 120 of server 145a may then retrieve the intermediate results from result cache 170 to quickly render frames 1, 2, and 3 from scene 1, or output images 328a-328c.

On the other hand, diagram 320 demonstrates frames from two different scenes. As shown in diagram 320, object 354a may remain common between the two scenes. Thus, if output images 328a and 328b are rendered in parallel, redundancy is introduced as object 354a is unnecessarily rendered two times.

Referring then to FIG. 1, scheduler 160 may instead assign server 145a to render object 354a, which may be present in geometry cache 124a, and server 145b to render object 354b, which may be present in geometry cache 124b, and server 145c to render object 354c, which may be present in geometry cache 124c. The resulting shading of the objects is stored in result cache 170. Rendering application 120 of server 145a may then retrieve the intermediate results from result cache 170 to quickly render frame 1 from scenes 1 and 2, or output images 328a-328b. Thus, by utilizing distributed element rendering as by the process described above, servers 145a-145c may be utilized for highly parallel and data coherent global illumination rendering with less calculation redundancy.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing distributed element rendering, the computing device comprising:
a processor configured to:
receive a plurality of shading queries for adding to a request queue;
determine an assignment of the request queue to a plurality of hardware resources based on a resource map, wherein the resource map is built based on a scene bounding hierarchy traversal of object geometry and indicates a plurality of scene geometry caches available to each of the plurality of hardware resources, and wherein each of the plurality of hardware resources includes a set of camera rays for global illumination tracing in the plurality of scene geometry caches; and
process the request queue according to the assignment.

2. The computing device of claim 1, wherein after processing the request queue according to the assignment, the processor is further configured to render a plurality of frames by the plurality of hardware resources.

3. The computing device of claim 1, wherein after receiving the plurality of shading queries, the processor is further configured to utilize a cost metric to compare the assignment of the request queue to the plurality of hardware resources with retrieving geometry and shading data from the plurality of scene geometry caches and performing the shading queries locally.

4. The computing device of claim 1, wherein the processor is further configured to forward the plurality of shading queries to another processor if the plurality of shading queries do not yield intersection hits.

5. The computing device of claim 1, wherein the resource map utilizes a scene bounding hierarchy of a scene corresponding to the plurality of frames.

6. The computing device of claim 1, wherein the processing further records a result of the plurality of shading queries in a result cache for the request queue.

7. The computing device of claim 1, wherein the processing further records a tessellation of the plurality of scene geometry caches in a result cache for the request queue.

8. The computing device of claim 1, wherein the processing further records a level of detail (LOD) of the plurality of scene geometry caches in a result cache for the request queue.

9. The computing device of claim 1, wherein the plurality of frames correspond to multiple scenes.

10. The computing device of claim 1 further comprising a memory, wherein the request queue and the resource map are stored in the memory.

11. A method for providing distributed element rendering, the method comprising:
   receiving a plurality of shading queries for adding to a request queue;
   determining an assignment of the request queue to a plurality of hardware resources based on a resource map, wherein the resource map is built based on a scene bounding hierarchy traversal of object geometry and indicates a plurality of scene geometry caches available to each of the plurality of hardware resources, and wherein each of the plurality of hardware resources includes a set of camera rays for global illumination tracing in the plurality of scene geometry caches; and
   processing the request queue according to the assignment.

12. The method of claim 11, wherein after the processing of the request queue according to the assignment, the method further comprises rendering a plurality of frames by the plurality of hardware resources.

13. The method of claim 11, wherein after the receiving of the plurality of shading queries, the method further comprises utilizing a cost metric to compare the assignment of the request queue to the plurality of hardware resources with retrieving geometry and shading data from the plurality of scene geometry caches and performing the shading queries locally.

14. The method of claim 11 further comprising forwarding the plurality of shading queries to another processor if the plurality of shading queries do not yield intersection hits.

15. The method of claim 11, wherein the resource map utilizes a scene bounding hierarchy of a scene corresponding to the plurality of frames.

16. The method of claim 11, wherein the processing further records a result of the plurality of shading queries in a result cache for the request queue.

17. The method of claim 11, wherein the processing further records a tessellation of the plurality of scene geometry caches in a result cache for the request queue.

18. The method of claim 11, wherein the processing further records a level of detail (LOD) of the plurality of scene geometry caches in a result cache for the request queue.

19. The method of claim 11, wherein the plurality of frames correspond to multiple scenes.

20. The method of claim 11, wherein the request queue and the resource map are stored in a memory.

21. A system for providing distributed element rendering, the system comprising:
   a display;
   a computing device comprising:
      a memory comprising a request queue and a resource map;
      a processor configured to:
         receive a plurality of shading queries for adding to the request queue;
         determine an assignment of the request queue to a plurality of hardware resources based on the resource map, wherein the resource map is built based on a scene bounding hierarchy traversal of object geometry and indicates a plurality of scene geometry caches available to each of the plurality of hardware resources, and wherein each of the plurality of hardware resources includes a set of camera rays for global illumination tracing in the plurality of scene geometry caches; and
         process the request queue according to the assignment.

22. The system of claim 21, wherein after processing the request queue according to the assignment, the processor is further configured to render a plurality of frames by the plurality of hardware resources and show the plurality of frames on the display.

23. The system of claim 21, wherein after receiving the plurality of shading queries, the processor is further configured to utilize a cost metric to compare the assignment of the request queue to the plurality of hardware resources with retrieving geometry and shading data from the plurality of scene geometry caches and performing the shading queries locally.

24. The system of claim 21, wherein the processor is further configured to forward the plurality of shading queries to another processor if the plurality of shading queries do not yield intersection hits.

25. The system of claim 21, wherein the resource map utilizes a bounding volume hierarchy (BVH) of a scene corresponding to the plurality of frames.

26. The system of claim 21, wherein the processing further records a result of the plurality of shading queries in a result cache for the request queue.

* * * * *